June 19, 1951  H. C. ARMAGOST  2,557,167
POSITION INDICATOR SYSTEM FOR RACE CONTESTANT
Filed March 28, 1949  3 Sheets-Sheet 1

INVENTOR.
Harold C. Armagost
BY
Greek Wells
atty.

June 19, 1951  H. C. ARMAGOST  2,557,167
POSITION INDICATOR SYSTEM FOR RACE CONTESTANT
Filed March 28, 1949  3 Sheets-Sheet 2
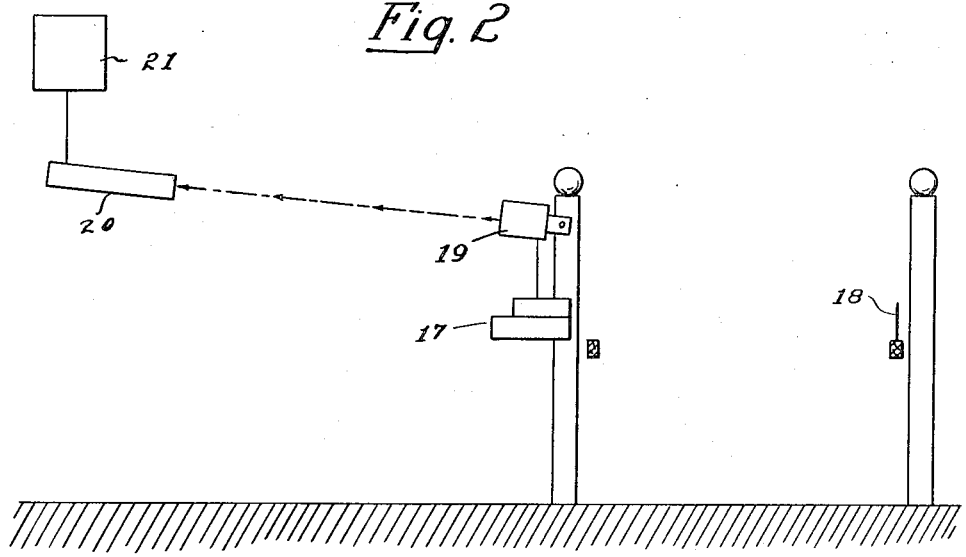
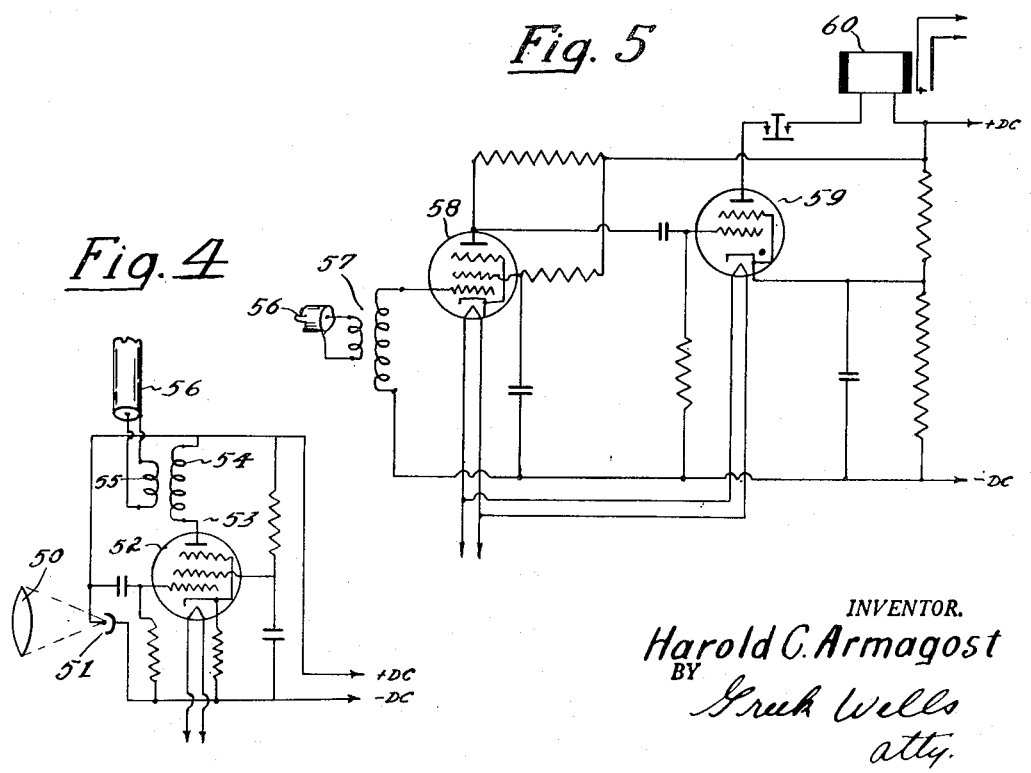
INVENTOR.
Harold C. Armagost
BY
Gruh Wells
atty.

INVENTOR.
Harold C. Armagost

Patented June 19, 1951

2,557,167

UNITED STATES PATENT OFFICE 2,557,167

POSITION INDICATOR SYSTEM FOR RACE CONTESTANT

Harold C. Armagost, Temple City, Calif., assignor to Electronic Timer Company, Inc., Temple City, Calif.

Application March 28, 1949, Serial No. 83,847

2 Claims. (Cl. 177—311)

1

The present invention is particularly directed to means for effecting automatic visual signaling from one point to another by the employment of sudden, high intensity light flashes. There are many situations where it is desirable to have instantaneous signal response from action of some sort at one point and at another point some distance away yet not so distant as to be beyond the range of a light flash of high intensity. For example, on race tracks there are several points along the track at which it is highly desirable to determine, instantaneously, when the race horse has passed. This can of course, be done with a wiring system leading from each control point (such as each quarter mile post), to a central or indicating system. It is not new to arrange a light source at one side of a track and a light sensitive element such as a photoelectric cell, at the opposite side with the beam of light from the light source continuously directed to the element so that when the horse crosses the path of the light beam, a change is caused in the current flow in the light sensitive element. It is the purpose of my invention to provide means whereby such a change, or other electrical impulse created by some action at a given point, may be caused to set up an instantaneous, high intensity, light flash and that flash may be used, day or night, in various weather conditions, to effect an indication, or actuate a recording or operating instrumentality of some sort.

Since the modern horse race track presents a very good example of the problem of getting actual visual indication at a distance of the time that a horse passes a given post, I shall describe my invention as applied to such a race track. It should be understood however that the invention is not limited in its application to such use but may be utilized wherever a like problem exists.

In the drawings:

Figure 2 is a diagrammatic view "across the track" illustrating the relative positions of the several parts of the system with respect to the race track and the timing booth;

Figure 4 is a diagrammatic view showing the optical and electrical devices at the signal receiving point.

Figure 1:
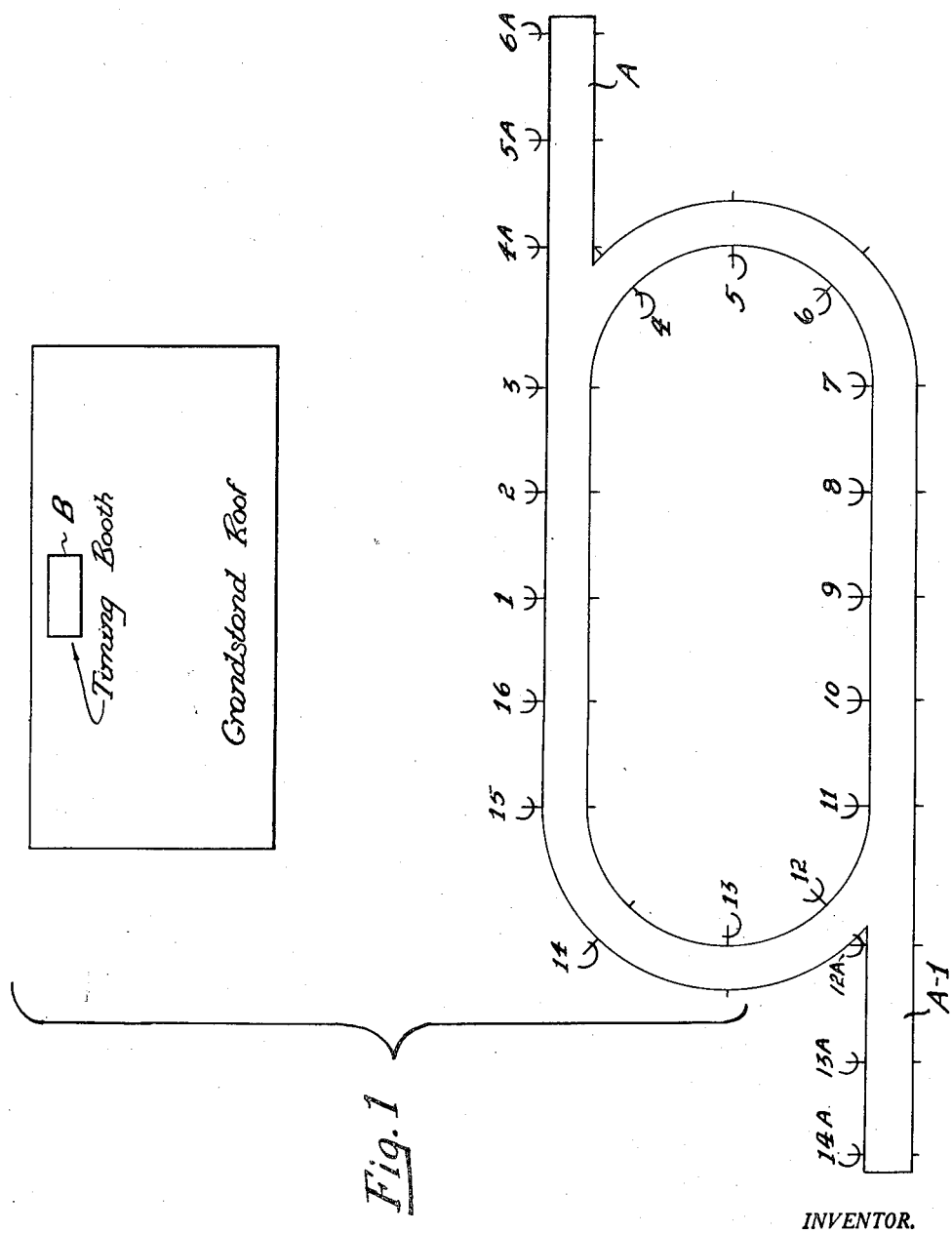
Figure 1 is a diagrammatic showing of a typical race track layout equipped to utilize the present invention.

The showing in Figure 1 at the points 1 to 16 indicates each sixteenth pole on a mile track. The several points 4A, 5A, 6A, 12A, 13A and 14A in the chutes A and A—1 are additional starting points. For example, the point 12A is the starting point for the six furlong race. The timing booth is shown at B. It may be located at any point within or outside the track where one can see what is going on around the track. The timing booth should not be set up where it would interfere with the photo-finish operations at the finish line.

Referring now to Figure 2, an across the track view at one of the timing points is given with diagrammatic indications of the various equipment units used. The equipment units used at the track are placed at as many of the timing points or poles 1—16 around the track as may be desired. The equipment at the track is simple enough to install at each post without excessive expense, since no wiring around the track, or from the track to the timing booth is required.

At each timing point I install a small exciter lamp unit 17 at the rail to direct a continuous beam of light straight across the track to a mirror 18 at the opposite rail. Well above the track and exciter lamp a flash lamp unit 19 is mounted. This unit 19, as will be described later, includes a high intensity instantaneous light source and an optical system to focus the high intensity beam upon a timing unit 20 at the timing booth. It is usually necessary to provide only enough of the units 20 to time races of normal length by quarter miles. Usually only five quarters of timing is used. An amplifier unit 21 is connected to the unit 20 and furnishes an electric impulse to any suitable timing system.

Figure 3:
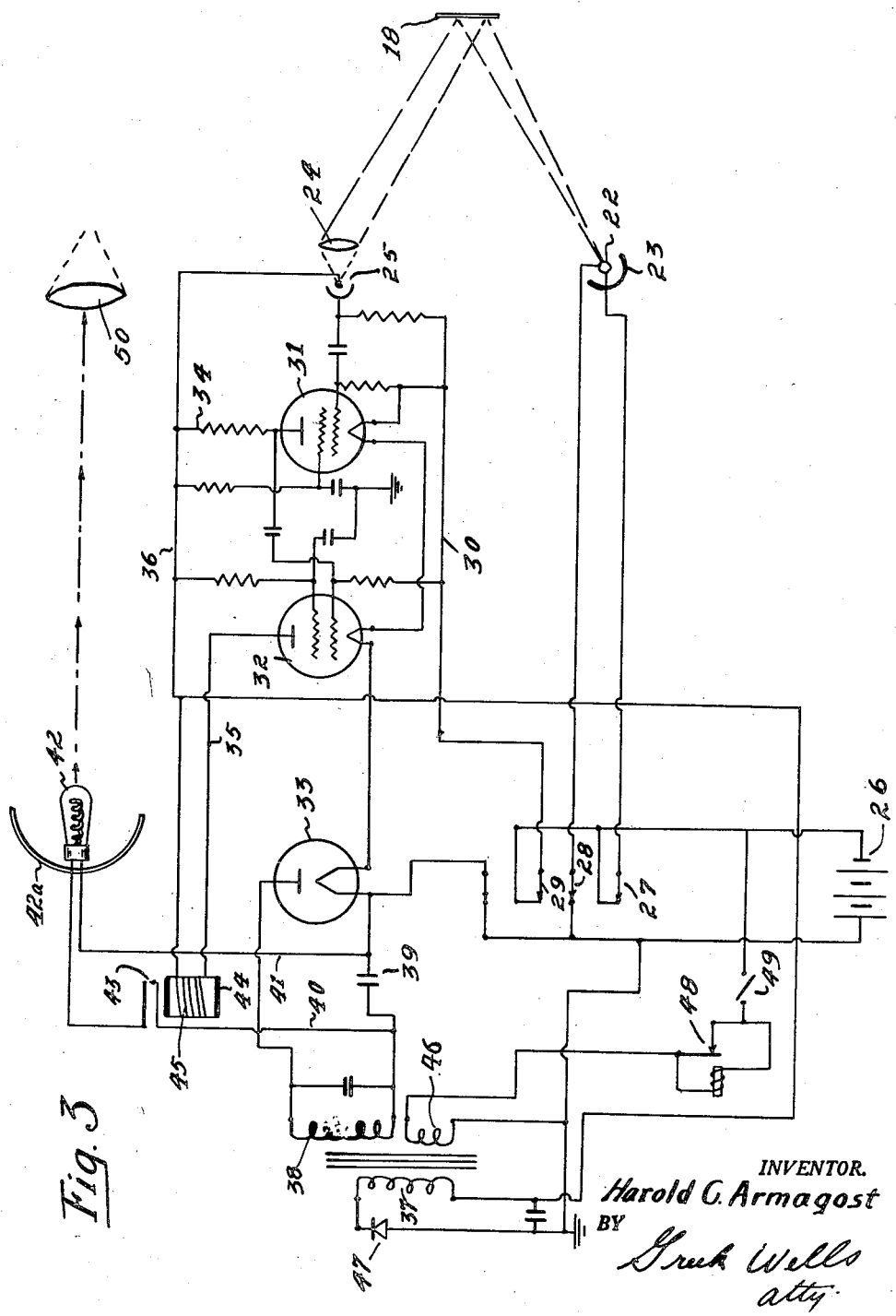
Figure 3 is a diagrammatic view showing the electrical and optical devices and their operating circuits at each signaling point.

Referring now to Figure 3 of the drawings where the details of units 17 and 19 and their connections are shown, the parts and operation of these units will be described. The exciter lamp 22 is provided with a reflector 23 to concentrate a beam of light upon the mirror 18. The light in turn is reflected back upon a collector lens 24 that is focused upon a photoelectric cell 25. Current is supplied from a battery 26 through switches 27 and 28 to the exciter lamp 22. The battery also connects through a switch 29 to an energizing lead 30 for the photo-electric cell 25. The lead 30 also supplies grid potential and filament current to amplifier tubes 31 and 32 and filament current to a rectifier tube 33. The plate leads 34 and 35 of the amplifier tubes are connected by a lead 36 through a transformer coil 37 and a rectifier 47 to ground. The transformer has a secondary coil 38 in circuit with the rectifier 33 and a condenser 39. The circuit including the rectifier 33, the secondary coil 38 and the condenser 39 provides a high potential charge across two leads 40 and 41. The lead 41 is connected to one terminal of a high light intensity gaseous discharge lamp 42. The lead 40 is connected through normally open contacts 43 to the other terminal of the lamp 42.

The contacts 43 are controlled by a relay 44, the energizing coil 45 of which is in the plate lead 35 of the amplifier tube 32. The circuit including the photo-electric cell 25 and the tubes 31 and 32 is inoperative, so long as the light beam from the exciter lamp 22 reaches the photo-electric cell 25, to energize the relay coil 45 and cause closing of the contacts 43.

In order to charge the high voltage circuit including the coil 38, a vibrator 48 is connected across the battery 26 under control of a manual switch 49. This vibrator has a primary coil 46 in the transformer.

When the light beam to cell 25 is broken the cell conductivity changes causing a surge of current in the relay coil 45. This closes the contacts 43 and the high voltage charge across the leads 40 and 41 is placed across the lamp 42 firing the lamp and causing a very short, very high intensity light flash from the lamp 42.

The light flash from the lamp 42 is directed by a suitable reflector 42a of the lamp through a collecting lens 50 upon a photo-electric cell 51 at the timing booth or signal receiving station. The photo-electric cell 51 is connected in the control circuit of an amplifier tube 52 which is selective to very short pulses of energy only. The amplified current in the plate lead 53 of the tube 51 goes through the primary coil 54 of an impedance matching transformer, the secondary coil 55 of which is in a low impedance transmission line 56. This low impedance line leads to a second impedance matching transformer 57 which is connected in the control grid circuit of an amplifier tube 58. The input circuit associated with this tube is also so constructed as to be sensitive to pulses of steep wave front, that is, where the increase or decrease in intensity is practically instantaneous.

The tube 58 has its output connected to a thyratron tube 59 which operates a relay 60 that is part of a known timing system. For example, there are timing systems now used where timers for the several parts are set into operation by a relay energized when the starting line is crossed. Thereafter a stop relay for each timing post is energized upon the crossing of the line at that post by the first horse. The patent to Belock No. 2,318,450 is an example of a known timing system of this type. The relay 60 of the present device is used to perform the work of relays 41 and 68, 681 etc., of the Belock patent.

It is appreciated that these prior timers do provide means for timing various portions of the race. However, such devices require wiring along the track and from the track to the timing booth. This wiring system makes the cost prohibitive for a great many installations. My invention provides a new and relatively inexpensive means for indicating on the timing system that the horses have passed a timing position on the track. My invention is not limited to race timing. It is adapted to any condition where a high intensity light flash may serve the purpose of a long wire line and avoid the expensive line installations.

Having thus described my invention, I claim:

1. A system for signalling the passing of a race contestant at a plurality of points on a race track to a central timing point comprising individual independent signal units at the several points, each including a high intensity light source and a control circuit operable to energize the light source momentarily upon the passing of the contestant at that point, a receiving photo-electric cell at the central timing point, means directing the light from the sources at the several points upon said cell, and an amplifier circuit including said photo-electric cell, responsive only to sudden light change upon said cell from said sources.

2. A system for signalling the passing of a race contestant at a plurality of points on a race track to a central timing point comprising individual independent signal units at the several points, each including a high intensity light source and a control circuit operable to energize the light source momentarily upon the passing of the contestant at that point, a receiving photo-electric cell at the central timing point, means directing the light from the sources at the several points upon said cell, an impulse amplifying circuit including said photo-electric cell and responsive only to steep wave front light changes, said high intensity light source comprising a high intensity gaseous conduction lamp at the sending point operable when energized to provide a steep wave front light change, an energizing circuit for said lamp, including a condenser and means to establish a high potential to energize said lamp, normally open circuit connections from said lamp to the condenser, and control means for closing said connections.

HAROLD C. ARMAGOST.

REFERENCES CITED

The following references are of record in the file of this patent:

UNITED STATES PATENTS

| Number | Name | Date |
|---|---|---|
| 1,504,603 | Chubb | Aug. 12, 1924 |
| 2,240,800 | Rigert | May 6, 1941 |
| 2,299,798 | Colson et al. | Oct. 27, 1942 |
| 2,396,280 | Miller | Mar. 12, 1946 |
| 2,422,766 | Alexander | June 24, 1947 |
| 2,425,258 | MacLagan et al. | Aug. 5, 1947 |
| 2,478,908 | Edgerton | Aug. 16, 1949 |